United States Patent [19]

Pinnavaia et al.

[11] Patent Number: 4,629,712
[45] Date of Patent: Dec. 16, 1986

[54] DELAMINATED CLAY MATERIALS

[75] Inventors: Thomas J. Pinnavaia, East Lansing, Mich.; Rasik H. Raythatha, Tennille, Ga.

[73] Assignee: Michigan State University, East Lansing, Mich.

[21] Appl. No.: 641,912

[22] Filed: Aug. 17, 1984

[51] Int. Cl.[4] .............................................. B01J 21/16
[52] U.S. Cl. .......................................... 502/63; 502/84
[58] Field of Search ....................... 502/63, 80, 84, 60

[56] References Cited

U.S. PATENT DOCUMENTS

| | | | |
|---|---|---|---|
| 3,979,331 | 9/1976 | Stridde | 502/84 X |
| 4,176,090 | 11/1979 | Vaughan et al. | 502/63 |
| 4,216,188 | 8/1980 | Shabria et al. | 502/63 |
| 4,238,364 | 12/1980 | Shabtai | 502/60 X |
| 4,271,043 | 6/1981 | Vaughan | 502/81 X |
| 4,410,751 | 10/1983 | Shin et al. | 502/84 X |
| 4,436,832 | 3/1984 | Jacobs et al. | 502/84 |
| 4,452,910 | 6/1984 | Hopkins et al. | 502/84 |

Primary Examiner—Carl F. Dees
Attorney, Agent, or Firm—Stefan J. Klauber

[57] ABSTRACT

Delaminated trioctahedral smectite clay compositions are provided having a substantially delaminated interlayer structure with a face-to-edge and edge-to-edge association of the clay layers and an inorganic metal oxide intercalated between the clay layers. A process for preparing delaminated smectite clay compositions comprises reacting an admixture of a trioctahedral smectite clay having an average particle size up to about 500 angstroms and a polymeric cationic hydroxy metal complex in an aqueous medium and recovering the reacted clay solids.

20 Claims, 3 Drawing Figures

DELAMINATED CLAY MATERIALS

FIELD OF THE INVENTION

The present invention relates to novel clay derived compositions and, more particularly, to a novel derivative of smectite clay minerals which possess bimodal pores and facilitate diffusion of large molecules and to a novel method for preparing such compositions.

BACKGROUND OF THE INVENTION

Naturally occurring and synthetic smectite clays such as bentonite, montmorillonite, hectorite, sapoite, nontronite, etc. are generally comprised of layers which may be visualized as a "sandwich" or platelet containing two outer sheets of silicon tetrahedra and an inner or central octahedral sheets of a hydrous metal oxide, such as alumina or magnesia octahedra. These platelets are stacked one upon the other to yield a clay particle. Normally this arrangement yields a repeating structure about every ten angstroms to give a material with low surface area. Smectites can be classified into two categories, dioctahedral and trioctahedral, the differences being the number of octahedral sites in the central sheet which are occupied. This, in turn, is related to the valence of the cation in the central sheet, with the dioctahedral smectites having central cations which are trivalent and substituents which are divalent, whereas the trioctahedral smectites have divalent central cations with monovalent substitutents.

It is known that increased permanent porosity could be introduced into smectite clay minerals by separating these platelets further, by as much as 30 to 40 angstroms, by intercalation with various polar molecules such as water, ethylene glycol and various amines which function as molecular props or pillars, separating the platelets and preventing the layers from collapsing to van der Waals contact. Thus, a variety of organic materials could be adsorbed on the exposed intracrystal surfaces. However, the interlayered clays thus prepared were not suitable for general adsorbent and catalytic applications because of the limited resistance to decomposition at high temperatures (maximum about 250° C.) of the interlayer cations.

More recently, increased interest in "pillared" clay intercalates has resulted in work being done to develop classes of ions which would separate the platelets further and/or would exhibit thermal stability to about 500° C. or greater. A variety of robust cations have been suggested for use to pillar smectite clays, including bicyclic amine cations, tris metal chelates, and polyoxocations. Small oxide aggregates have also been suggested as pillars. Such pillared smectites have formed materials useful as adsorbents, catalyst supports, filter medium or the like. For example, in U.S. Pat. No. 4,176,090, and U.S. Pat. No. 4,271,043, montmorillonite interlayered with polyoxocations of aluminum and zirconium have been shown to function as cracking catalysts for conversion of petroleum distillates to high-octane gasoline and diesel fuel with efficiencies comparable to that of commercial zeolite-based catalysts. The polyoxocation pillars are stable inorganic polymers of oxides of the metals formed by hydrolysis of metal salts which were impregnated into the open structure of the clay at the appropriate pH. Such stable, pillared smectite clay compositions have an interlayer spacing in the range of 14 to 20 angstroms. Also, in U.S. Pat. Nos. 4,216,188 and 4,238,364 are shown pillared or cross-linked smectites such as montmorillonite formed with aluminum or chromium hydroxide pillars having uniform interlayer distances (basal spacing) in the range of up to about 20 angstroms.

However, it has been found that there are limitations in the pore sizes that can be achieved in such pillared smectite compositions and in the molecular size of organic materials with which they can be used. It would, therefore, be highly desirable to prepare clay materials having thermal stability with an expanded pore size which would permit admission and free diffusion of large hydrocarbon and other molecules in the intracrystalline pore system.

It is, therefore, a primary object of this invention to provide a method for providing smectite clay compositions having lammellar and delaminated association of the layers of clay.

Another object of this invention is to provide a new and improved smectite clay composition of high temperature stability with expanded pore size that would permit admission and free diffusion of large hydrocarbon and other molecules.

Still another object of this invention is to provide a method for producing new and improved smectite clay compositions of high temperature stability and with expanded pore size that would permit admission and free diffusion of large hydrocarbon and other molecules.

Another object of the invention is to provide porous expanded clay materials having intercalated structures between the interlayers of clay.

Still another object of the invention is to provide a method for producing smectite clay compositions which are useful as catalyst supports, adsorbents, filtering bed media and the like.

These and still further objects of the invention will become readily apparent to one skilled in the art from the following detailed description, specific Examples and drawings.

SUMMARY OF THE INVENTION

In accordance with the present invention there is provided a process for preparing delaminated smectite clay compositions having bimodal pores which facilitate diffusion of large hydrocarbon molecules, comprising:

reacting an admixture of a trioctahedral smectite clay mineral having an average particle size up to about 500 angstroms and, in general, a lath shape morphology, and a polymeric cationic hydroxy metal complex in an aqueous medium; and recovering the reacted clay solids, preferably by freeze-drying, though air-drying, spray-drying and the like techniques may also be suitable.

Preferably, the reaction mixture is treated to remove unreacted polymeric cationic hydroxy metal complex before recovering the reacted clay solids. In a particularly preferred embodiment of the process, the recovered clay solids are further treated by heating to remove all or substantially all adsorbed and intercrystalline water from the product.

It has been discovered that smectite clay compositions prepared in accordance with the practice of the invention have a complete or substantially "delaminated" structure. The predominantly edge-to-edge and edge-to-basal association of the clay layers provide a combination of macro-, meso-, and micro-porosity in the clay which has high thermal stability.

Also provided in accordance with the present invention is a delaminated trioctahedral smectite clay composition of high thermal stability having bimodal pores with a high degree of macroporosity, a substantially basal-to-edge and edge-to-edge association of the clay layers, an inorganic metal oxide between the layers thereof and which exhibits an extremely diffused or substantially nonexistent X-ray diffraction pattern.

It has been discovered that the smectite clay compositions of the invention exhibit a substantially (at least 80%), and preferably completely delaminated interlayer structure, a high degree of macropores of generally regular distribution in the range of 9-26 microns, and is capable of adsorbing large size hydrocarbon and other molecules.

DETAILED DESCRIPTION OF THE PREFERRED EMBODIMENTS

Figure 1:
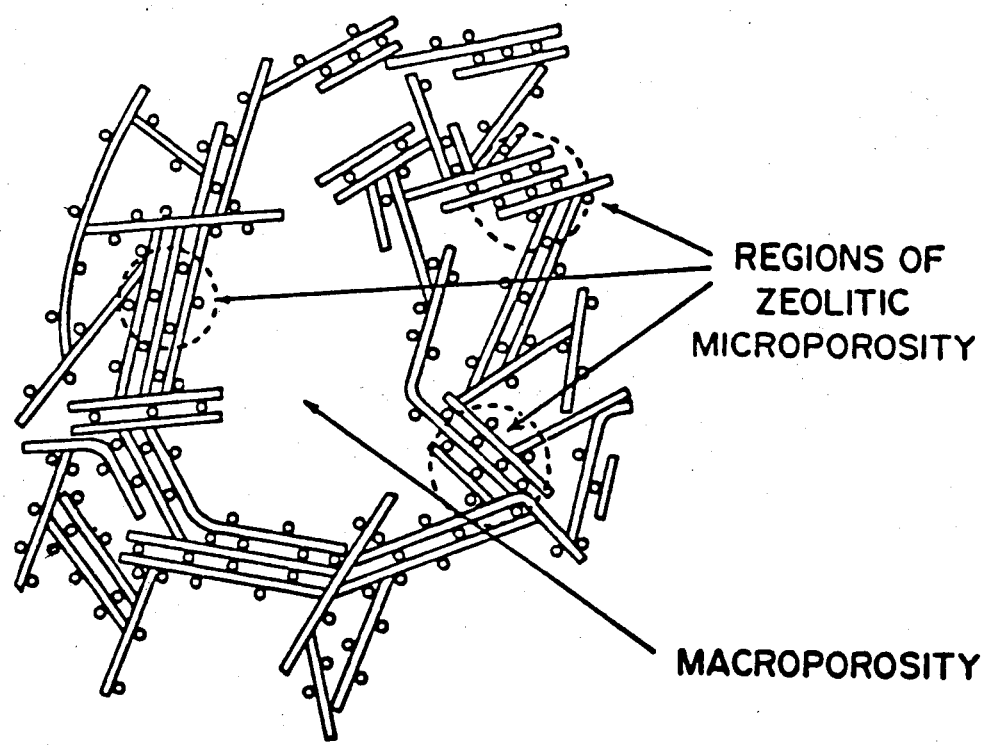
FIG. 1 is a representation of the structure of a delaminated intercalated clay of the present invention.

In accordance with the present invention, there are provided novel "delaminated" smectite clay compositions of high thermal stability having pores with a high degree of macroporosity, mesoporosity and microporosity, an inorganic metal oxide intercalated between the interlayers of the clay which, surprising and unexpectedly, exhibits an extremely diffused or substantially non-existent X-ray diffraction pattern. The term "delaminated clay structure" as used in the present specification and in the appended claims is a term of art which indicates an edge-to-face (basal) and edge-to-edge layer association of the clay layers often referred to as a "house of cards" structure.

The term "intercalation" as used in the present specification and in the appended claims is a term of art which indicates the insertion of a material between the layers of a clay.

The term "intercalated" and "pillared" as used in the present specification and in the appended claim defines in the present specification and in the appended claim defines a clay structure wherein molecular props or pillars are inserted between the clay layers to keep them separated.

The clays which can be utilized as starting materials for the clay products of the invention are selected from the group of minerals commonly called smectites and their synthetic analogues.

Smectites are 2:1 clay mineral that carry a lattice charge and characteristically expand when solvated with water and alcohols, most notably ethylene glycol and glycerol. These minerals comprise layers represented by the general formula:

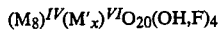

$(M_8)^{IV}(M'_x)^{VI}O_{20}(OH,F)_4$ wherein IV indicates an ion coordinated to four other ions, VI indicates an ion coordinated to six other ions and x may be 4 or 6. M is commonly $Si^{4+}$, $Al^{3+}$ and/or $Fe^{3+}$, but also includes several other four coordinate ions such as $P^{5+}$, $B^{3+}$, $Ge^{4+}$, $Be^{2+}$, and the like. M' is commonly $Al^{3+}$ or $Mg^{2+}$, but also includes many possible hexacoordinated ions such as $Fe^{3+}$, $Fe^{2+}$, $Ni^{2+}$, $Co^{2+}$, $Li^+$, and the like. The charge deficiencies created by the various substitutions into these four and six coordinate cation positions are balanced by one or several cations located between the structural units. Water may also be occluded between these structural units, bonded either to the structure itself, or to the cations as a hydration shell. When dehydrated (dehydroxylated), the above structural units have a repeat distance of about 9 to 12 angstroms, as measured by X-ray diffraction. Commercially available natural smectites include montmorillonite (bentonite), beidellite, hectorite, saponite, sauconite and nontronite. Also commercially available are synthetic smectites such as LAPONITE®, a synthetic hectorite available from Laport Industries Limited.

Smectites are classified into two categories, dioctahedral and trioctahedral, the difference being the number of octahedral sites in the central layer which are occupied. This, in turn, is related to the valency of the cation in the central layers.

The dioctahedral smectites have central cations which are trivalent and substituents which are divalent, whereas trioctahedral smectites have divalent central cations with monovalent substituents. Dioctahedral smectites include montmorillonite, beidelite and nontronite wherein, for example, montmorillonite has as the octahedral cation (M'), aluminum, with magnesium as the substituent. Trioctahedral smectites include hectorite and saponite and their synthetic forms wherein, for example, hectorite has as the octahedral cation (M'), magnesium, with lithum as the substituent.

The smectite most advantageously used in the preparation of the compositions of this invention is a trioctahedral smectite clay having a lath-shape morphology. However, trioctahedral smectites of platety-shape or mixed lath-shape and platety-shape morphology can be employed. Exemplary of suitable trioctahedral smectite clays are natural saponite, and prefereably, natural hectorite and synthetic hectorite.

While the use of trioctahedral smectites having a lath-shape morphology is important in preparing the compositions of the invention delaminated structure of the composition of the invention, it has been discovered that the particle size of the clays is an extremely important, if not essential, factor in achieving such completely or nearly completely delaminated clay structures.

Smectite clays typically have a clay-fraction with a very small average particle size of less than 2 microns. However, the smecite clays suitable for use in preparing the compositions of the present invention must be of an extremely small particle size, generally having an average particle size less than about 500 angstroms. Smectite clays having an average particle size of about 200 angstroms or even smaller are especially preferred.

In accordance with the present invention, the novel delaminated clay compositions can be prepared by reacting an admixture of a trioctohedral smectite clay having an average par ticle size of about 500 angstroms, or preferably smaller, with a lath-shape morphology and a polymeric cationic hydroxy metal complex in an aqueous medium, and then recovering the clay solids reaction product by freeze drying. A delaminated clay composition is thus prepared having a polymeric cationic hydroxy metal complex intercalated between layers of the clay. Upon dehydroxylation and/or calcination of the delaminated clay composition by heating the same at a temperature of at least 100° C., and preferably at least about 300° C. to 600° C., the intercalated metal complex is decomposed to form an inorganic metal oxide.

One general technique of preparing the delaminated clay composition of the invention involves fully dispersing the smectite clay mineral having an average particle size of less than 500 angstroms in water at room temperature to prepare a uniform dispersion thereof containing up to about 5 weight percent of clay; slowly adding with vigorous agitation, the clay suspension to a previously prepared solution of a polymeric cationic hydroxy metal complex and reacting said admixture at room temperature, while stirring, for at least about 30 minutes, and preferably 2 or more hours. After carrying out the reaction at room temperature for up to about 2 hours, the reaction mixture may be heated to about 60° to 70° and maintained at that temperature for another hour or more until the desired reaction is completed. The reaction mixture is then cooled to ambient or room temperature, washed or treated by other means known in the art to remove unreacted metal complex, and preferably, freeze-dried to recover the delaminated clay solids. The use of air drying, spray drying or the like techniques for recovering the reacted clay solids may be suitable for certain clay aggregation and therefore is less desirable and should, in general, be avoided.

The reaction between the clay and polymeric metal complex may be carried out, generally, at any temperature above the freezing point and below the boiling point of water. While the discussions herein and the experiments reported in the Examples employ a batch process for carrying out the reaction, the process according to the practice of the invention may, alternatively, be performed on a continuous basis.

Subsequent to recovery of the delaminated clay solids, the desired delaminated clay structure can be completed by heating the product to dehydrate (dehydroxylate) and/or calcine the clay and the metal complex polymer intercalated between the layers thereof. A temperature which is sufficient to dehydroxylate the clay mineral and the metal complex polymer normally ranges from 100° C. to about 600° C.

Polymeric cationic hydroxy metal complexes suitable for use in preparing the delaminated clay compositions of the invention include the inorganic polymers generally known as basic aluminum, zirconium and/or titanium complexes which are formed by the hydrolysis of aluminum, zirconium, and/or titanium salts. Such polymers and the method of making the same are disclosed in U.S. Pat. No. 4,176,090 to Vaughn et al. Copolymers of such metal complexes with silica and magnesium may also be used.

The inorganic aluminum polymers comprise solutions of discrete polymer particles having a generally spherical shape and a diameter of about 8 angstroms and in which the aluminum atoms are present in the tetrahedral coordinated form to an extent of up to about 10% as determined by NMR measurement, the remainder being octahedral coordinated. The inorganic aluminum polymers suitable for use are visualized as having the general formula:

$$Al_{2+n}(OH)_{3n}X_6$$

wherein n has a value of about 4 to 12; and X is usually Cl, Br, and/or NO$_3$. These inorganic metal polymers are believed to have an average molecular weight of from about 300 to 3000.

In addition to the above described aluminum complex polymers, polymeric cationic hydroxy complexes of metals such as zirconium, titanium, and mixtures thereof may also be used. Preparation and description of zirconium complexes are disclosed in U.S. Pat. Nos. 4,176,090 and 4,271,043.

Also suitable for use in accordance with the practice of the invention are the metal hydroxide oligomers, e.g. aluminum hydroxide or chromium hydroxide prepared either by slow hydrolysis of an appropriately buffered aqueous solution of the corresponding metal salt or, alternatively, by high dispersion of precipitated metal hydroxide in water. Such metal complexes are prepared as disclosed in U.S. Pat. No. 4,216,188 to Shabtai et al.

The clay is reacted with an amount of polymeric cationic hydroxy metal complex sufficient to give an intercalated cationic hydroxy complex structure. The amount of metal polymer complex intercalated within the clay interlayers should be at least sufficient to maintain the spacing of the expanded clay. On the other hand, the amount of metal complex polymer intercalated within the interlayers should not be so much that the interlayer regions actually become plugged with metal complex. In general, the amount of the polymeric cationic hydroxy metal complex reactant can be varied over a fairly broad range, but in general, the amount used should be sufficient to provide at least 0.25 moles of cation such as aluminum or zirconium per unit cell of clay, and preferably, at least about 2 moles of cation per unit cell. The maximum concentration of the polymeric metal complex reactant is generally not critical. However, it has been found that concentrations greater than about 5 moles of cation per unit cell does not provide any further advantages, and concentrations in excess of about 8 moles of cation per unit cell may be detrimental to the available surface area.

The delaminated smectite clay compositions of the present invention have high thermal stability (up to about 500° C. or even greater), exhibit a substantially (at least about 80% delaminated), and preferably, completely delaminated interlayer structure with a face-to-edge and edge-to-edge association of the clay layers, and have an inorganic metal oxide intercalated between the clay layers or platelets. The products display a high degree of macro-, meso- and micro-porosity with a generally regular macropore distribution in the range of about 9 to 26 microns. Moreover, surprisingly and unexpectedly, the clay products of the invention have a short range, i.e. less than 4 layers of clay of face-to-face association and exhibit a generally featureless X-ray diffraction pattern with substantially no or extremely diffuse 001 X-ray reflections (greater than about 4.0°, and preferably, at least about 6.0° 2θ half-widths). Referring to the drawing, FIG. 1 represents a typical delaminated intercalated clay wherein the layers or platelets have a repeat distance of up to about 20 angstroms, and the layers of clay are in an edge-to-edge and edge-to-face association. The product has a N$_2$- Bet surface area greater than about 150M$^2$/g, and generally greater than 250M$^2$/g.

The delaminated clay products of the present invention are useful as adsorbents in a variety of applications and as catalytic supports. The clay product has a substantial adsorption capacity for organic molecules with a kinetic diameter greater than 10 angstroms, e.g. perfluorotribulylamine.

Having generally described this invention, a further understanding can be obtained by reference to certain specific examples which are provided herein for purposes of illustration only and are not intended to be limiting unless otherwise specified.

EXAMPLE 1

Experiment A

Natural sodium hectorite (California) with a lath-shape morphology was dispersed in water at the 1 wt % level and the clay fraction with a particle size less than 2 microns was collected by sedimentation. The clay was treated with 0.2 N $NaHSO_4$ to remove carbonate and then dialyzed. One gram of the clay in 100 ml of deionized water was added slowly to a vigorously stirred polyoxyaluminum solution prepared by dissolving 2.6 grams of 50% aluminum chlorohydrate (50% CHLORHYDROL®, Reheis Chemical Company) in 50 ml of deionized water. The formal aluminum concentration of the aluminum chlorohydrate (ACH) solution was 0.23M. The reaction mixture was stirred 2 hours at room temperature and then heated with stirring to 70° C. for 4 hours. The reaction mixture was then cooled to room temperature. The clay was washed free of chloride by suspending in deionized water and centrifuging. The final product was collected by freeze-drying.

Experiment B

The same sedimented hectorite clay described above with an average particle size less than 2 microns was subjected to centrifugation at 11,000 rpm to remove particles with an effective radius greater than approximately 500 angstroms. The less than 500 angstrom particle size fraction remaining in suspension represented approximately 30% by weight of the original sample. One gram of the less than 500 angstrom particle size fraction in 100 ml of water was allowed to react with a polyoxyaluminum solution of 2.6 grams aluminum chlorohydrate (ACH) in 50 ml of deionized water following the same methods described above. The reaction mixture was then cooled to room temperature. The clay was washed free of chloride by suspending in deionized water and centrifuging. The clay solids product was collected by freeze-drying.

Figure 2:
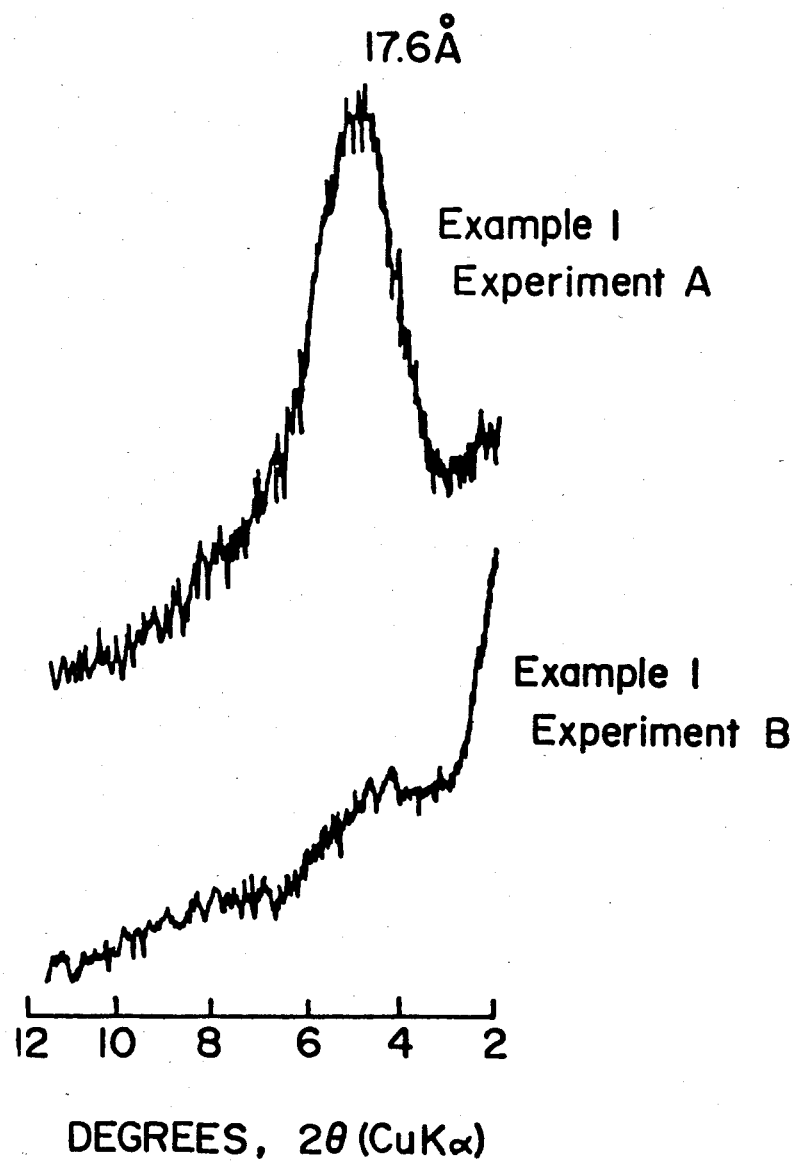
FIG. 2 is a series of 001 X-ray diffraction patterns of intercalated hectorite clay structures derived from clay minerals of different average particle sizes.

An X-ray diffractogram of the clay product from Experiment A of this Example (see FIG. 2) shows that the product consisted primarily of a long range, face-to-face, pillared clay structure. The product was also determined to exhibit a $N_2$BET surface area of 139 $m^2/g$.

An X-ray diffractogram of the clay product from Experiment B of this Example (see FIG. 2) shows that the product exhibited a diffuse X-ray reflection pattern and that the product consisted primarily of edge-to-edge and edge-to-face association of the clay layers. Thus, it is shown that a small particle size (less than 500 angstroms) promotes the preparation of a clay composition wherein the clay platelets of the product were in a delaminated array. The product of Experiment B was determined to have a $N_2$BET surface area of 207 $m^2/g$ 1.3 mmoles of benzene per gram at 25° C. and a partial pressure of 1.0.

EXAMPLE 2

A synthetic hectorite, LAPONITE® RD, Laporte Industries, Ltd., with an average particle size of 200 angstroms, and cation exchange capacity (CEC) of 55 meq/100 g, was allowed to react with ACH according to the same method described in Example I. The freeze-dried product gave a chemical analysis corresponding to the anhydrous unit cell formula $[Al(OH)_{2.90}]_{3.70}[Mg_{5.64}Li_{0.36}](Si_{8.00})O_{20}(OH)_4$.

The X-ray diffraction pattern of the clay product was essentially devoid of 001 reflections, indicating a nearly complete delaminated structure.

The clay product was also determined to adsorb 0.94 mmole of perfluorotributylamine per gram at 25° C. and a partial pressure of 1.0. The $N_2$ BET surface area of the clay was 364 $m^2/g$.

EXAMPLE 3

One and one-half gram of synthetic hectorite (LAPONITE® RD) with an average particle size of 200 angstroms and a CEC of 55 meq/100 g was dispersed in 150 ml of deionized water. A solution of polyoxyzirconium ions was prepared by dissolving 3.28 grams of zirconyl chloride octahydrate in 50 ml of deionized water. The solution, which was formally 0.20 M in zirconium, was aged 2 days at 70° C. and then filtered to remove a small amount of precipitate. The polyoxyzirconium solution was cooled to room temperature and the Laponite suspension was added dropwise with rapid stirring. After aging 2 hours at 25° C., the reaction mixture was heated to 70° C. for 3 hours. The reaction product was washed free of excess salt with deionized water and collected by freeze-drying.

The X-ray diffraction pattern of the clay product was devoid of 001 reflections, indicating a completely delaminated (house-of-cards) structure. The clay composition exhibited a $N_2$ BET surface area of 364 $m^2/g$. The adsorption capacity on a per gram basis for benzene with a kinetic diameter of 5.8 angstroms and 2,3-dimethylpropane (6.2 angstroms) at 25° C. was 2.75 and 1.89 mmole, respectively. Thus, polyoxo metal cations of zirconium may be used to prepare delaminated smectite clays.

EXAMPLE 4

A 1.0 percent by weight aqueous suspension containing one gram of synthetic hectorite, LAPONITE® RD with a 200 angstrom particle size and 55 meq/100 g CEC, was added to a vigorously stirred polyoxyaluminum solution containing 2.6 grams of ACH (50% Chlorhydrol) in 50 ml of deionized water. The rate of addition of clay to the polyoxyaluminum solution was approximately 40 ml per minute. The reaction mixture was stirred for 2 hours at room temperature, transferred to dialysis tubing, and then dialyzed until free of chloride. The volume of the dialyzed suspension was reduced under vacuum to provide a concentration of 8–10 grams of product per 100 ml of water. This latter mixture was then freeze-dried to recover the clay solids.

The clay product exhibited a $N_2$ BET surface area of 358 $m^2/g$ and adsorbed 0.654 mmole of perfluorotubunated structure. Mercury porosimetry studies over the range 0–60, 000 psi (equivalent pore radii greater than or equal to 18 angstroms) indicated that the clay product had a pore volume of 0.17 cc/g with 50% of this volume resulting from pores with a radius greater than 900 angstroms.

EXAMPLE 5

Figure 3:
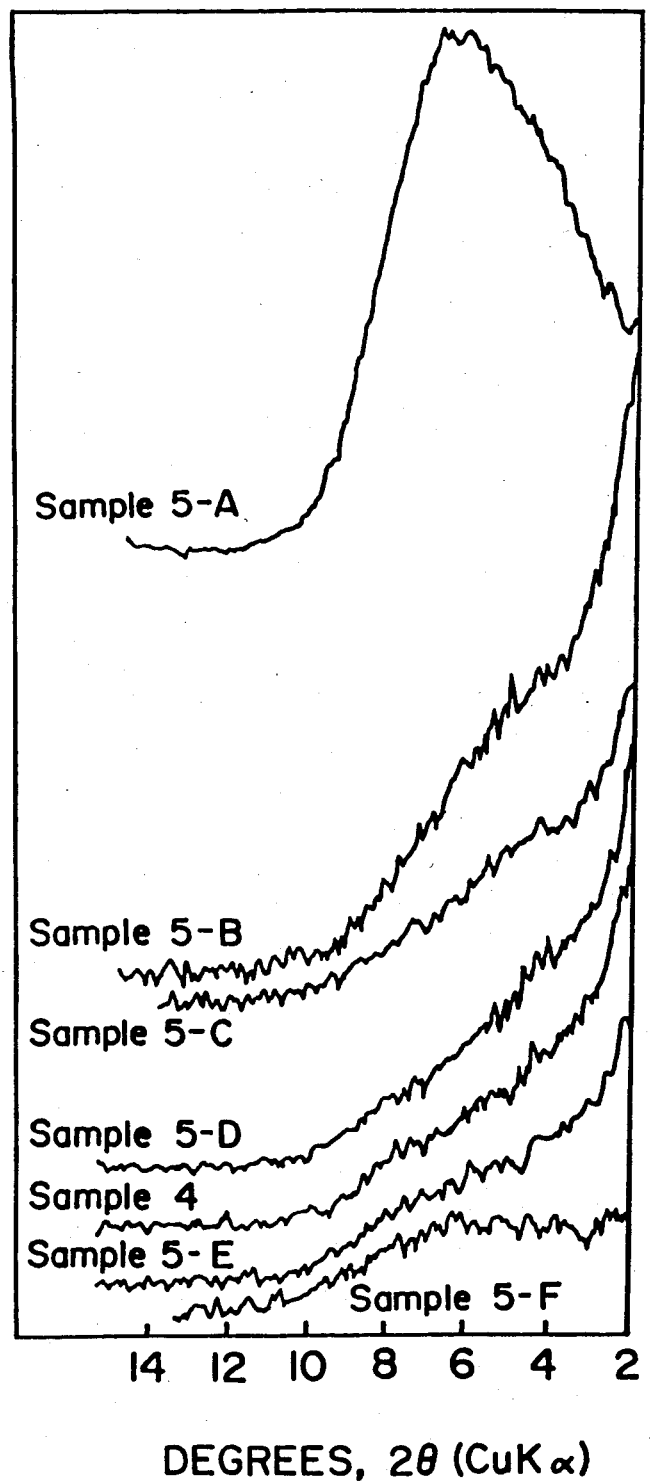
FIG. 3 is a series of 001 X-ray diffraction patterns of synthetic hectorite clay structures prepared with different amounts of polyoxo aluminum cation.

A series of products were formed by the reaction of synthetic hectorite (LAPONITE ® RD, 200 angstroms particle size, 55 meq/100 g CEC) with different amounts of polyoxyaluminum cations in the form of ACH (50% CHLORHYDROL ®). The procedure based on one gram of hectorite clay in a 1.0 percent by weight aqueous suspension was identical to Example 4 except that the amounts of ACH used were 0.0336, 0.327, 0.800, 1.30, 5.20, and 9.99 grams. The freeze-dried products formed from these reactions were designated Sample 5-A, 5-B, 5-C, 5-D, 5-E and 5-F, respectively. Table I summarizes the unit cell composition, surface areas, and perfluorotributylamine adsorption capacities for each of the samples of this Example. Included in Table I for comparison purposes are data for the delaminated clay product of Example 4. In FIG. 3 is illustrated the X-ray diffraction patterns for samples 5-A through 5-F of this Example and the product of Example 4.

The adsorption data and surface area data show that a significant amount of delaminated structure is introduced even at a composition corresponding to 0.249 moles of polymeric aluminum ions per unit cell, even though this composition shows a broad 001 X-ray reflection (6.0° $2\theta$ CuK$_a$ half-width) (see FIG. 3). The maximum surface area is observed for Sample 5-C with 3.03 moles Al per unit cell, whereas the maximum adsorption capacity for perfluorotributylamine (PFTBA) occurs for Sample 5-D with 3.62 moles Al per unit cell. Thus the extent of delamination is optimized in the range near 3.0–3.5 Al moles per unit cell. Sample 5-C was determined to have a bulk density of 0.61 and a skeletal (apparent) density of 2.49.

TABLE I

| Sample | Grams ACH Used in Synthesis[a] | Moles Al per Unit Cell[b] | Surface Area m$^2$/g | PFTBA[c] Adsorbed, mmol per gram |
|---|---|---|---|---|
| 5-A | 0.0336 | 0.249 | 283 | 0.442 |
| 5-B | 0.327 | 1.43 | 341 | 0.757 |
| 5-C | 0.800 | 3.03 | 488 | 0.806 |
| 5-D | 1.30 | 3.62 | 438 | 0.892 |
| 5-E | 5.20 | 8.14 | 331 | 0.458 |
| 5-F | 9.99 | 14.1 | 264 | 0.156 |
| Example 4 | 2.60 | 5.00 | 358 | 0.654 |

[a]Synthetic procedure is described in Example I.
[b]The unit cell composition of the layers is [Mg$_{5.64}$Li$_{0.36}$] (Si$_{8.00}$)O$_{20}$(OH)$_4$.
[c]Perfluorotributylamine.

EXAMPLE 6

One gram of LAPONITE ®RD in a 1.0% weight aqueous suspension was added to a vigorously stirred polyoxyaluminum solution containing 1.30 grams of ACH (50% Chlorhydrol) and 50 ml of deionized water. The reaction mixture was stirred for 2 hours at room temperature, transferred to dialysis tubing and dialyzed until free of chloride. The resulting suspension was allowed to dry in the air. This synthesis is equivalent to that used for the preparation of Sample 5-D of Example 5, except that the final product was air-dried rather than freeze-dried.

The air-dried product of the present example exhibited a diffuse 001 X-ray reflection with a half-width of 6.3° $2\theta$ (CuK$_a$) indicating a small amount of face-to-face ordering (approximately 20%). In comparison, the width of the 001 defraction line for air-dried and freeze-dried pillared smectite clays with extensive face-to-face layer ordering (greater than 80%) is typically 2.0° $2\theta$ (CuK$_a$).

Despite the presence of a diffuse 001 X-ray reflection for the air-dried product of this Example, the N$_2$ BET surface area (3.6 m$^2$/gram) and perfluorotributylamine adsorption capacity (0.83 mmole/g) are generally comparable to the values observed for freeze-dried Sample 5-D of Example 5. Thus, this Example demonstrates that a synthetic hectorite having an extremely small particle size (about 200 angstroms) and lath-shaped morphology substantial layer delamination (greater than 80%) even when the product is recovered by air-drying.

EXAMPLE 7

A solution of polyhydroxychromium cations was prepared by adding an aqueous solution of sodium carbonate (0.034 moles) to an aqueous solution of chromium nitrate (0.034 moles) at 95° and allowing the resulting solution to age at 95° for 36 hours. To the hot chromium solution (340 ml) was added 1.0 gram of LAPONITE ®RD in 100 ml of water over a period of 10 minutes. The mixture was allowed to cool to room temperature over a period of 1.5 hours and then was dialyzed over an 8 hour period to remove excess chromium ions. The freeze-dried product showed no 001 reflection indicating delamination of layers. The N$_2$ BET surface area was 206 m$_2$/g and the adsorption capacity for perfluorotributylamine was 0.36 mmole/g.

This Example demonstrates that polyhydroxycation of chromium can also be used to prepare delaminated clay compositions.

Control Example A

Natural sodium montmorillonite (Wyoming) was suspended in deionized water and the less than 2 micron particle size fraction was recovered by sedimentation. The clay was treated with 0.1 N NaCl to ensure complete exchange to the sodium form. The clay was washed free of excess salt by repeated dispersion in distilled water and centrifugation. One gram of clay, which has a cation exchange capacity (CEC) of 80 meq/100 g, was dispersed in 100 ml of deionized water. A polyoxyaluminum cation solution was freshly prepared by dissolving 1.54 g of AlCl$_3$.6H$_2$O and 0.619 g of NaOH in 180 ml of deionized water (OH$^-$/Al$^{3+}$=2.42). The clay suspension was added dropwise to the vigorously stirred polyoxyaluminum solution. After a reaction time of 2 hours at room temperature the product was washed free of chloride with deionized water. The clay dispersion was divided into two portions, and one was freeze-dried, the other air-dried.

Chemical analysis indicated the anhydrous unit composition to be [Al(OH)$_{2.77}$]$_{2.52}$[Al$_{3.11}$Fe$_{0.42}$Mg$_{0.48}$](Si$_{7.88}$Al$_{0.12}$)O$_{20}$(OH)$_4$.

The adsorption properties of the air-dried and freeze-dried forms of the clay products of this Control Example A are given in Table II. The air-dried product has a BET N$_2$ surface area of 235 m$^2$/g but it fails to adsorb 1,3,5-triethylbenzene and perfluorotributylamine with kinetic diameters of 9.2 angstroms and 10.4 angstroms, respectively. However, the freeze-dried product with a surface area of 210 m²/g adsorbs both of the adsorbates, showing that freeze-drying results in the recovery of a clay composition wherein a small portion thereof exhibits a delaminated house-of-cards structure which arises from edge-to-edge and edge-to-face association of the clay layers. It will be seen from the adsorption results reported in Table II, that the amount of perfluorotributylamine (PFTBA) (kinetic diameter 10.4 angstroms) adsorbed by the freezedried clay composition of this Control Example A is substantially less than that adsorbed by the clay composition of Example 5 reported in Table I.

Approximately 20-30% of the freeze-dried product has a delaminated structure. The remaining 70-80% of the surface area results from face-to-face contacts and these face-to-face aggregates give rise to a pillared structure and the observed 001 X-ray reflections. The pillared structure is evident from the presence of a sharp $d_{001}$ X-ray reflection between 16–19 angstroms (2.0° $2\theta$ CuK$_\alpha$ half-width), depending on temperature (see Table III). Essentially all the layers in the air-dried product are associated through face-to-face contacts and are involved in a pillared structure. The freeze-dried product also shows a $d_{001}$ X-ray reflection 2.0° $2\theta$ CuK$_\alpha$ half-width) between 16–19 angstroms (see Table III).

Control Example B

A less than 2 micron fraction of natural sodium montmorillonite (Wyoming) was collected by standard sedimentation procedures. The clay was slurried in 0.1 N NaCl to ensure complete exchange to the Na$^+$ form and then the clay was washed free of excess salt with deionized water. One gram of this sodium montmorillonite with a CEC of 80 meq/100 g, was dispersed in 100 ml of deionized water. The dispersion was added slowly to a vigorously stirred solution of polyoxyaluminum cations prepared by dissolving 2.6 g of 50% aluminum chlorohydrate (50% CHLORHYDROL®, Reheis Chemical Co.) in 50 ml of deionized water. The formal aluminum concentration of this ACH solution was 0.23 M. The reaction mixture was allowed to age 2 hours at room temperature and then the flocculated clay was washed free of chloride ion by repeated suspension in deionized water and centrifugation. The washed sample was divided into two parts. One part was allowed to dry in air at room temperature and the other was freeze-dried.

Chemical analysis indicated the anhydrous unit cell formula to be [A](OH)$_{2.80}$]$_{2.87}$[A]$_{3.11}$Fe$_{0.42}$Mg$_{0.48}$](Si$_{7.88}$Al$_{0.12}$)O$_{20}$(OH)$_4$. The adsorption properties of the air-dried and freeze-dried portions of the clay product of this Control Example B are reported in Table II. The air-dried version of the clay composition of this Control Example is incapable of adsorbing molecules with a kinetic diameter equal to 9.2 angstroms, such as 1,3,5-triethylbenzene, or with kinetic diameters greater than this value, such as perfluorotributylamine (10.4 angstroms). However, the freeze-dried version of the clay composition adsorbs 0.71 and 0.42 mmole of 1,3,5-triethylbenzene and perfluorotributylamine (PFTBA), respectively, per gram of clay. It will be seen that the amount of PFTBA adsorbed is substantially less than that adsorbed by the clay compositions of Example 5 as reported in Table I.

Values of the $d_{001}$-spacing for the freeze-dried and air-dried version of the clay product of this Control Example B at elevated temperatures are given in Table III. The half-widths of the 001 X-ray reflections for the air-dried and freeze-dried samples were 2.0°+0.2° $2\theta$ CuK$_\alpha$.

The freeze-dried clay composition was determined to have a bulk density of 0.20 and a skeletal (apparent) density of 2.89.

TABLE II

| | | Adsorption Data for Air-Dried & Freeze-Dried Pillared Montmorillonite[a] | | | | |
|---|---|---|---|---|---|---|
| Control Example | Drying Method | N$_2$ Surface Area m²/g | Amount Adsorbed, mmole/g | | | |
| | | | C$_6$H$_6$(5.8)[b] | C(CH$_3$)$_4$(6.2)[b] | 1,3,5-Et$_3$C$_6$H$_3$(9.22)[b] | (F$_9$C$_4$)$_3$N(10.4)[b] |
| A | Air-Dry | 235 | 1.21 | 0.86 | 0.00 | 0.00 |
| | Freeze-Dry | 210 | 1.51 | 0.90 | 0.55 | 0.35 |
| B | Air Dry | 306 | 1.72 | 1.12 | 0.00 | 0.00 |
| | Freeze Dry | 284 | 1.61 | 1.02 | 0.71 | 0.43 |

[a]Samples were activated in vacuum at 350° C. for 3 hours prior to adsorption of organic adsorbates at 25° C. The equilibrium pressures (torr) were as follows: Benzene, 70; Neopentane, 728; 1,3,5-triethylbenzene, 0.18; perfluorotributylamine, 0.22.
[b]Values in parentheses are kinetic diameters in angstroms.

TABLE III

| | Basal Spacings (angstroms) of Air-Dried and Freeze-Dried Pillard Montmorillonites[a] | | | |
|---|---|---|---|---|
| | Control Example A | | Control Example B | |
| Temperature °C. | Air-Dry | Freeze-Dry | Air-Dry | Freeze-Dry |
| 25 | 19.1 | 18.8 | 19.8 | 18.9 |
| 350 | 18.5 | 17.0 | 18.5 | 17.7 |
| 550 | 16.4 | 16.1 | 16.1 | 16.2 |

[a]Samples were equilibrated in air for 2 hours at the temperatures indicated prior to measurement of the 001 reflection.

Having now fully described the invention, it will be apparent to one of ordinary skill in the art that many changes and modifications can be made thereto without departing from the spirit or scope of the invention as set forth herein. The described embodiments are to be considered in all respects only as illustrative and not restrictive and the scope of the invention is, therefore, indicated by the appended claims rather than by the foregoing description. All claims that come within the meaning and range of equivalency of the claims are to be embraced within this scope.

What is claimed is:

1. A process for preparing delaminated smectite clay compositions having a high degree of macroporosity which facilitate the diffusion of large hydrocarbon molecules, comprising reacting an admixture of a trioctahedral smectite clay mineral having an average particle size up to about 500 angstroms and a polymeric cationic hydroxy metal complex in an aqueous medium; and recovering the reacted clay solids.

2. The process according to claim 1, wherein said clay solids are recovered by drying.

3. The process according to claim 2, wherein said clay solids are recovered by freeze-drying.

4. The process according to claim 1, wherein said admixture is reacted at a temperature between the freezing point and boiling point of water.

5. The process according to claim 1, wherein said smectite is selected from the group consisting of hectorite, synthetic hectorite and mixtures of the same.

6. The process according to claim 1, wherein said metal complex has the formula $Al_{2+n}(OH)_{3n}X_6$ wherein n has the value of 4 to 12 and wherein up to about 10% of the aluminum is tetrahedrally coordinated; and X is selected from the group consisting of Cl, Br, $NO_3$ and $CO_3$.

7. The process according to claim 1, wherein said metal complex is aluminum chlorohydrol.

8. The process according to claim 1, wherein said metal complex contains zirconium.

9. The process according to claim 1, which includes heating said delaminated clay solids at a temperature between about 100° C. and 600° C.

10. The process according to claim 1, wherein said clay mineral has a lath-shape and/or platety-shape morphology.

11. A process for preparing a delaminated smectite clay composition, comprising:
(a) preparing an aqueous slurry of a trioctahedral clay mineral having an average particle size smaller than about 500 angstroms and a lath-shape and/or platety-shape morphology;
(b) reacting said clay mineral with a polymeric cationic hydroxy metal complex;
(c) removing unreacted metal complex from said clay-metal complex reaction mixture; and
(d) recovering reacted clay solid by drying.

12. The process according to claim 11, wherein said clay solids are recovered by freeze-drying.

13. The process according to claim 11 or claim 12, wherein said smectite clay is hectorite, synthetic hectorite, or mixtures of the same.

14. The process according to claim 11, which includes the step of dehydroxylating and/or calcining said recovered clay solids.

15. A delaminated smectite clay composition comprising a delaminated trioctahedral smectite clay having a substantially delaminated interlayer structure with a face-to-edge and edge-to-edge association of the clay layers and an inorganic metal oxide intercalated between the clay layers which composition exhibits a combination of macro-, meso- and micro-porosity.

16. The clay composition according to claim 15, wherein said clay composition exhibits a generally featureless X-ray diffraction pattern with substantially no or extremely diffuse 001 X-ray reflections.

17. The clay composition according to claim 15, wherein the composition exhibits a 001 X-ray reflection with a half-width greater than about 4° $2\theta$ using $CuK_\alpha$ radiation.

18. The clay composition according to claim 15, wherein the face-to-face layer association or pillaring is short range.

19. The composition according to claim 15, wherein said metal oxide intercalated between clay layers contains aluminum, zirconium or mixtures of the same.

20. A hydrocarbon conversion catalyst comprising the delaminated smectite clay composition of claim 15.

* * * * *